United States Patent
Tang et al.

(10) Patent No.: US 9,590,737 B2
(45) Date of Patent: Mar. 7, 2017

(54) MULTI-CHANNEL, PARALLEL TRANSMISSION OPTICAL MODULE, AND METHODS OF MAKING AND USING THE SAME

(71) Applicant: Source Photonics (Chengdu) Co., Ltd., Chengdu (CN)

(72) Inventors: Xiaohui Tang, Chengdu (CN); Qiang Wang, Chengdu (CN); Yuefeng Sun, Chengdu (CN); Kui Wu, Chengdu (CN); Yuanzhong Xu, West Hills, CA (US)

(73) Assignee: Source Photonics (Chengdu) Co., Ltd., Chengdu (CN)

( * ) Notice: Subject to any disclaimer, the term of this patent is extended or adjusted under 35 U.S.C. 154(b) by 0 days.

(21) Appl. No.: 14/417,994

(22) PCT Filed: Jan. 27, 2015

(86) PCT No.: PCT/CN2015/071599
§ 371 (c)(1),
(2) Date: Jan. 28, 2015

(87) PCT Pub. No.: WO2016/119115
PCT Pub. Date: Aug. 4, 2016

(65) Prior Publication Data
US 2016/0216466 A1  Jul. 28, 2016

(51) Int. Cl.
*H04B 10/00* (2013.01)
*H04B 10/50* (2013.01)
(Continued)

(52) U.S. Cl.
CPC ......... *H04B 10/501* (2013.01); *G02B 6/4246* (2013.01); *G02B 6/4249* (2013.01);
(Continued)

(58) Field of Classification Search
CPC ......... H04J 14/02; H04B 10/40; H04B 10/43; H04B 10/50; H04B 10/506; H04B 10/502;
(Continued)

(56) References Cited

U.S. PATENT DOCUMENTS 8,376,634 B2   2/2013   Oki et al.
8,412,052 B2 *  4/2013   Mohammed ......... G02B 6/4249
                                              385/52
(Continued)

FOREIGN PATENT DOCUMENTS

WO   2011052802 A2   5/2011

OTHER PUBLICATIONS

International Search Report and Written Opinion mailed Oct. 21, 2015; International Application No. PCT/CN2015/071599; 9 pages; International Searching Authority/China, State Intellectual Property Office of the People's Republic of China; Beijing, China.

*Primary Examiner* — Hanh Phan
(74) *Attorney, Agent, or Firm* — Andrew D. Fortney; Central California IP Group, P.C.

(57) ABSTRACT

A high speed optical module, and in particular, a multi-channel, single-mode, parallel transmission optical module in the field of optical communication is disclosed. The optical module includes a chassis, a first transmitter optical subassembly (TOSA), a second transmitter optical subassembly (TOSA), a third transmitter optical subassembly (TOSA), a fourth transmitter optical subassembly (TOSA) and a MT fiber connector. The TOSA may be a TO-38 TOSA of a 10 G DFB chip or FP chip. With single-mode communication, the optical module provides a transmission distance over 10 kilometers. In addition, to make coupling single-mode fibers easier, a twelve-core MT fiber connector is employed, wherein four fiber connectors are respectively connected to LC standard fiber stubs and the outputs of the
(Continued)

TOSAs accordingly. Thus, the optical module further provides high speed and long-distance transmission, large capacity, small volume, and light weight and can be broadly applied to high speed optical communications.

20 Claims, 1 Drawing Sheet

(51) Int. Cl.
 *G02B 6/42* (2006.01)
 *G02B 6/38* (2006.01)
 *G02B 6/44* (2006.01)
(52) U.S. Cl.
 CPC .......... *G02B 6/4292* (2013.01); *G02B 6/3885* (2013.01); *G02B 6/421* (2013.01); *G02B 6/428* (2013.01); *G02B 6/4245* (2013.01); *G02B 6/4263* (2013.01); *G02B 6/4472* (2013.01)
(58) Field of Classification Search
 CPC H04B 10/503; H04B 10/5053; G02B 6/4249; G02B 6/4257; G02B 6/4265
 USPC ....... 398/182, 183, 200, 201, 135, 136, 137, 398/138, 164, 139, 141, 158, 159, 79; 385/88, 89, 90, 92, 93, 52, 53, 55
 See application file for complete search history.

(56) References Cited

U.S. PATENT DOCUMENTS

| | | |
|---|---|---|
| 8,550,724 B2 | 10/2013 | Oki |
| 8,550,725 B2 | 10/2013 | Oki |
| 8,579,521 B2 | 11/2013 | Oki et al. |
| 8,821,037 B2 | 9/2014 | Oki et al. |
| 8,821,038 B2 | 9/2014 | Oki et al. |
| 2011/0103797 A1 | 5/2011 | Oki et al. |
| 2011/0225792 A1 | 9/2011 | Oki et al. |
| 2011/0229095 A1 | 9/2011 | Oki |
| 2011/0229096 A1 | 9/2011 | Oki |
| 2011/0255831 A1 | 10/2011 | Oki et al. |
| 2011/0262078 A1 | 10/2011 | Oki et al. |
| 2012/0251116 A1* | 10/2012 | Li ........................... H04J 14/02 398/79 |
| 2012/0308180 A1 | 12/2012 | Tosetti et al. |
| 2013/0121651 A1 | 5/2013 | Takahashi et al. |
| 2015/0037044 A1* | 2/2015 | Peterson .............. G02B 6/4292 398/135 |

* cited by examiner

MULTI-CHANNEL, PARALLEL TRANSMISSION OPTICAL MODULE, AND METHODS OF MAKING AND USING THE SAME

FIELD OF THE INVENTION

The present invention relates to the field of optical communication. More specifically, embodiments of the present invention pertain to a high speed optical module, particularly to a multi-channel parallel transmission, small form-factor pluggable (SFP) optical module and methods of making and using the same.

DISCUSSION OF THE BACKGROUND

In 1964, Gordon Moore predicted that the number of transistors that can be placed on an affordable integrated circuit will double during a specific time period, usually said to be every 18 months or every 2 years. Gilder's Law says that while computer power may double every eighteen months (Moore's law), communications power doubles every six months. Bandwidth grows at least three times faster than computer power. In 1999, John Roth, then CEO of Nortel, said that Nortel Networks is moving at twice the speed of Moore's Law, doubling the capacity of its fiber-optic systems and halving the cost every nine months.

The aforesaid predictions have been proven in the development of communication technology, and also indicate that higher speed, larger capacity and smaller size is continuously needed. Moreover, with high needs for anti-interference, security, long relay distance, large communication capacity, low cost, light weight and small size, optical communication is one key to the application and development of communication technology.

At present, optical communication is highly miniaturized and fast. As optical modules play an important role in facilitating the development and modernization of the optical communications industry, smaller and faster optical modes are continuously needed. Conventional high speed optical modules comprises various types, but most of them have an undesirably high cost or a less-than-optimal balance of miniaturization and high speed.

In the past, a simple way to increase the speed and processing capacity of optical modules is to combine a plurality of optical modules. However, the size of the equipment increases with the number of optical modules. Also, the connections between the optical modules and the communication ports of the corresponding system become more complicated. Meanwhile, the capacity of a data processor or data processing center connected to the optical modules must continuously increase. In addition, there is demand for optical modules with a transmission distance that ranges from hundreds of meters to 10 km or more, but there is currently no commercially available high speed parallel optical module that has a transmission distance over 2 km.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is intended to overcome one or more deficiencies in the prior art, and provide a multi-channel, parallel transmission, SFP optical module. The present invention optical module advantageously provides high speed and long-distance transmissions, and has a large capacity, small volume, and light weight.

In order to achieve the present objective, the present invention provides a technical scheme as the following: a multi-channel, parallel transmission, small form-factor pluggable (SFP) optical module, including a multi-channel SFP chassis, a first transmitter optical subassembly (TOSA), a second transmitter optical subassembly (TOSA), a third transmitter optical subassembly (TOSA), a fourth transmitter optical subassembly (TOSA), and a mechanical transfer (MT) fiber connector, wherein the first TOSA, the second TOSA, the third TOSA, and the fourth TOSA are on the multi-channel SFP chassis in parallel, and the outputs of the first through fourth TOSAs are connected to the MT fiber connector. In some embodiments, the optical module and chassis are for a quad-channel SFP optical module.

In additional or alternative embodiments, the optical module is a single-mode optical module. Thus, the first TOSA, the second TOSA, the third TOSA, and the fourth TOSA can transmit signals (e.g., data) in a single mode (e.g., at a single rate and/or a single wavelength). Relative to multi-mode transmission, single-mode transmission has low inter-module dispersion, higher transmission stability, and greater remote communication applicability. Furthermore, the first TOSA, the second TOSA, the third TOSA, and the fourth TOSA may each comprise a transistor outline (TO; e.g., TO-38) package or housing, and a Fabry Perot (FP) or diffusion feedback (DFB) laser diode configured to transmit signals or data at a rate of at least 10 Gb/sec.

A QSFP optical module has a quad-channel SFP interface, and can transmit data at a speed four times greater than a single-channel optical module. A QSFP optical transceiver can also receive four optical data signals over separate channels, and have the same size as one XFP optical transceiver. However, as the size of a QSFP optical module is about the same as that of an XFP optical module, it may be important to design or select the size (e.g., diameter) of the TOSAs so that four optical transmitter subassemblies are in parallel in the relatively small size of the SFP package. In fact, the width and other dimensions and/or parameters of SFP optical modules are relatively constant from module type to module type (e.g., QSFP vs. SFP+ vs. XFP). The external width of the QSFP chassis is 18.5 mm at most, and the internal width is 17 mm at most. The maximum diameter of the TO-38 TOSA housing or package is 3.8 mm or about 3.8 mm. Thus, four TO-38 TOSAs including 10 G FP or DFB laser diodes can be arranged in parallel on the QSFP chassis, thereby matching the size and/or width of the QSFP chassis and providing a transmission rate of 40 Gb/sec. When the combined widths of the transmitter subassemblies match the internal width and other dimensions and/or parameters of the chassis (and, optionally, the standard interface), the present invention can provide data at a rate X times that of a single-channel transmitter (where X≥2, preferably ≥4).

In further embodiments, the first TOSA, the second TOSA, the third TOSA and the fourth TOSA may be attached to a printed circuit board (PCB) or printed circuit board assembly (PCBA) via one or more flexible connectors (e.g., a flexible polyimide substrate with thin-film conductive electrodes or traces thereon). Thus, the optical module may further comprises a PCB or PCBA. Furthermore, the PCB or PCBA may be attached to the SFP chassis by screws or rivets.

In one embodiment, a first port of the MT fiber connector is further connected to an MPO connector. In a further or alternative embodiment, the MT fiber connector comprises a twelve-core MT fiber connector. In some embodiments involving the QSFP interface and/or chassis, four fiber connectors of the MT fiber connector are respectively connected to a first fiber stub, a second fiber stub, a third fiber stub, and a fourth fiber stub. The four fiber connectors are different and/or separate from the first port of the MT fiber connector. The fiber stubs may be LC standard fiber stubs and/or may comply with a Telecommunications Industry Association/Electronics Industry Association Fiber Optic Connector Intermateability (TIA/EIA FOCIS) standard. Optical signals from the first TOSA, the second TOSA, the third TOSA, and the fourth TOSA may pass through the first fiber stub, the second fiber stub, the third fiber stub, and the fourth fiber stub, respectively, and then enter the MT fiber connector.

In single-mode transmissions using the present optical transmitter or module, the glass at the core center of a single-mode fiber is relatively fine (e.g., the core diameter is 9 or 10 µm) in comparison with the fiber core of a multi-mode fiber, which may have a diameter of 50-62.5 µm. Thus, it is challenging to couple signals from optical transmitters to single-mode fibers, and the connection of single-mode fibers is relatively costly and complicated. To solve this issue, in some embodiments, fiber connectors from the MT fiber connector are separated from the receiver port of the MT fiber connector, and respectively connected with the first fiber stub, second fiber stub, third fiber stub and fourth fiber stub, and with the optical emission ports of the first TOSA, the second TOSA, the third TOSA, and the fourth TOSA, respectively. This manner of coupling the fiber stub (e.g., the LC standard fiber stubs) and the TOSA is effective, simplifies the method of assembling the optical transmitter and/or module, and solves issues with the connection between single-mode fibers and the optical transmitters.

In further embodiments, a second port of the MT fiber connector is connected with an array-type optical receiver. The array-type optical receiver may be on or fixed to the PCB or PCBA. The array-type optical receiver may comprise an array of lenses and a corresponding array of photodiodes (PDs). The array may be linear (e.g., a 1-by-n array, in which n is the number of channels) or arranged in rows and columns (e.g., a p-by-q array, in which p*q is the number of channels). The lenses may comprise plastic, glass, or a combination thereof. Plastic may be preferred for cost reasons. The photodiodes may comprise avalanche photodiodes (APDs).

The operating principle(s) of and/or method of transmitting optical signals using a multi-channel, single-mode, parallel transmission SFP optical module may include transmitting optical signals from a first TOSA, a second TOSA, a third TOSA, and a fourth TOSA in parallel; passing the optical signals through a first fiber stub, a second fiber stub, a third fiber stub, and a fourth fiber stub corresponding to the first through fourth TOSAs, and through a mechanical transfer (MT) fiber connector; then transmitting the optical signals over optical fibers connected to a port of the MT fiber connector. Transmitting the optical signals through the MT fiber connector may comprise passing the optical signals through a first port of the MT fiber connector, over a plurality of MT fibers connected to the first port, and through a second port of the MT fiber connector connected to the plurality of MT fibers. The second port of the MT fiber connector is also connected to the optical fibers. The method may further include receiving the optical signals in an optical communication device (e.g., through an MPO connector coupled to the optical fibers). The first through fourth TOSAs are generally coupled to the first through fourth fiber stubs, and the first through fourth fiber stubs may be LC standard fiber stubs. In the present disclosure, a port of the MT fiber connector may include connections to n optical fibers, where n is the number of channels.

A method of receiving optical signals according to the present disclosure may include receiving the optical signals through an MPO connector coupled to a first port of an MT fiber connector, providing the optical signals over MT fibers in the MT fiber connector to a second port of the MT fiber connector, focusing the optical signals onto an array of photodiodes using a corresponding array of lenses coupled or connected to the second port, and transmitting the signals to a corresponding optical communication device over a PCB or PCBA connected to the array of photodiodes. The lenses in the lens array may comprise a plastic, a glass, or a combination thereof. The lenses may focus a total reflection and convergence of the optical signals onto the array of photodiodes. The array of photodiodes generally convert the optical signals to electrical signals, and may comprise an array of avalanche photodiodes.

Relative to the prior art, the present invention includes a multi-channel, parallel transmission SFP optical module that provides advantageous effects, including a relatively small size, light weight, low production cost, high production efficiency, and an ability to transmit optical signals a distance of more than 10 km at a transmission rate up to 40 Gb/sec. In single-mode communications, the present invention provides a transmission distance over 10 kilometers. In addition, to make coupling single-mode fibers easier, a plurality of fiber connectors in an MT fiber connector are respectively connected to fiber stubs of the various transmission channels and the outputs of the TOSAs. In one embodiment, the MT fiber connector comprises a twelve-core MT fiber connector. Thus, the present invention provides a high speed, large capacity, small volume, lightweight, long transmission distance optical module that can be broadly applied to high speed optical communications.

DETAILED DESCRIPTION

Figure 1:
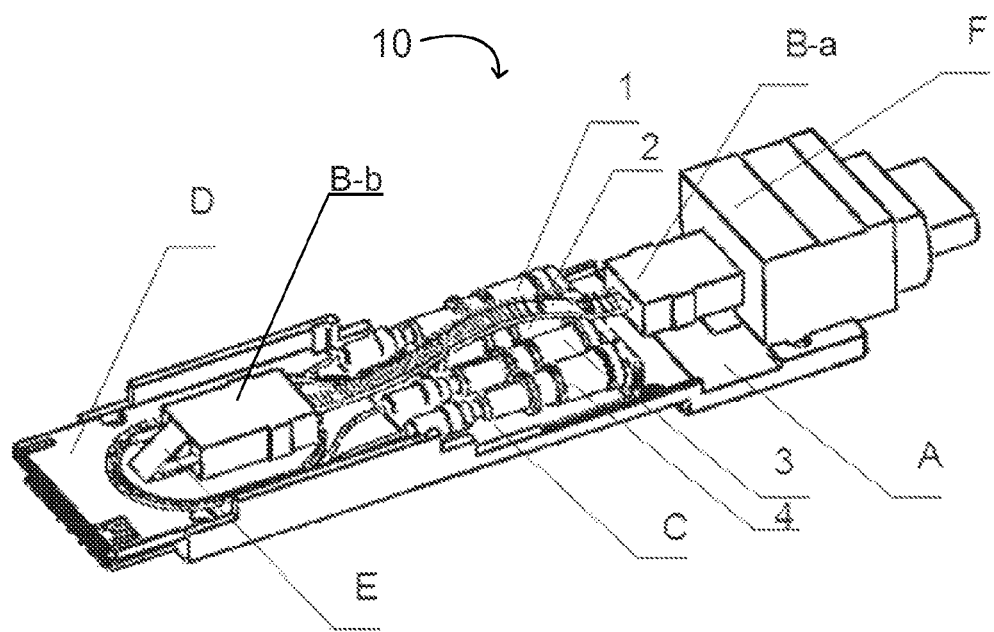
FIG. 1 is a diagram showing an exemplary 4*10 G single-mode parallel transmission QSFP optical module in accordance with an embodiment of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims.

Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the disclosure.

Some portions of the detailed descriptions which follow are presented in terms of processes, procedures, logic blocks, functional blocks, processing, and other symbolic representations of operations on code, data bits, or data streams within a computer, transceiver, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or circuit. It has proven convenient at times, principally for reasons of common usage, to refer to these signals as bits, streams, values, elements, symbols, characters, terms, numbers, or the like, and to their representations in computer programs or software as code (which may be object code, source code or binary code). It should be borne in mind, however, that all of these and similar terms are associated with the appropriate physical quantities and/or signals, and are merely convenient labels applied to these quantities and/or signals.

Unless specifically stated otherwise, or as will be apparent from the following discussions, it is appreciated that throughout the present application, discussions utilizing terms such as "processing," "operating," "calculating," "determining," or the like, refer to the action and processes of a computer, data processing system, or similar processing device (e.g., an electrical, optical, or quantum computing or processing device or circuit) that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data or information similarly represented as physical quantities within other components of the same or a different system or architecture.

Furthermore, in the context of this application, the terms "signal" and "optical signal" refer to any known structure, construction, arrangement, technique, method and/or process for physically transferring a signal or optical signal, respectively, from one point to another. Also, unless indicated otherwise from the context of its use herein, the terms "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use. Similarly, for convenience and simplicity, the terms "time," "rate," "period" and "frequency" are, in general, interchangeable and may be used interchangeably herein, as are the terms "data," "bits," and "information," but these terms are generally given their art-recognized meanings.

For the sake of convenience and simplicity, the terms "optical" and "optoelectronic" are generally used interchangeably herein, and use of either of these terms also includes the other, unless the context clearly indicates otherwise, but these terms are generally given their art-recognized meanings herein. Furthermore, the term "transceiver" refers to a device having at least one receiver and at least one transmitter, and use of the term "transceiver" also includes the individual terms "receiver" and/or "transmitter," unless the context clearly indicates otherwise. In addition, an "optical module" may include an optical or optoelectronic transceiver, receiver or transmitter. The acronym "SFP," which also refers to a standardized interface for optical modules, also includes the acronyms and/or standards SFP+ and XFP, unless the context of its use clearly indicates otherwise, and the acronym "MT," which also refers to a standardized connector between an optical fiber and a circuit board, also includes the acronyms and/or standards MTP and MPO (multiple-fiber push-on/pull-off), MT-RJ (mechanical transfer registered jack or media termination-recommended jack), MIC (media interface connector), SC (subscriber connector, square connector, or standard connector), SC-DC (SC-dual contact), SC-QC (SC-quattro contact), and other snap-type fiber connectors with the same or substantially the same dimensions, unless the context of its use clearly indicates otherwise.

Also, for convenience and simplicity, the terms "connected to," "coupled with," "communicating with," "coupled to," and grammatical variations thereof (which terms also refer to direct and/or indirect relationships between the connected, coupled and/or communicating elements unless the context of the term's use unambiguously indicates otherwise) may be used interchangeably, but these terms are also generally given their art-recognized meanings.

Various embodiments and/or examples disclosed herein may be combined with other embodiments and/or examples, as long as such a combination is not explicitly disclosed herein as being unfavorable, undesirable or disadvantageous. The invention, in its various aspects, will be explained in greater detail below with regard to exemplary embodiments.

Embodiments of the present invention will be fully and clearly described in conjunction with the drawings in the following description.

An Exemplary Optical Module and Exemplary Fiber Connector

As shown in FIG. 1, a first TOSA 1, a second TOSA 2, a third TOSA 3, and a fourth TOSA 4 are arranged in order and in parallel on a QSFP chassis A. One port B-b of a mechanical transfer (MT) fiber connector B (FIG. 2) is also attached or fixed to the QSFP chassis A. Referring back to FIG. 1, the outputs of the first, a second, third, and fourth TOSAs 1, 2, 3 and 4 are connected to the MT fiber connector B.

The first TOSA 1, the second TOSA 2, the third TOSA 3, and the fourth TOSA 4 may transmit optical signals in single-mode (e.g., at a single rate and/or a single wavelength). Relative to multi-mode transmission, single-mode transmission has low inter-module dispersion, higher transmission stability, and greater remote communication applicability. Furthermore, each of the first TOSA 1, the second TOSA 2, the third TOSA 3, and the fourth TOSA 4 may comprise a transistor outline (TO) package or housing, and a Fabry Perot (FP) or diffusion feedback (DFB) laser diode. The TO package or housing may comprise a standard TO package or housing, such as a TO-38 package or housing, but is not limited thereto. The FP or DFB laser diode may be a single-chip laser diode, and may be configured to transmit optical signals or data at a rate of at least 10 Gb/sec.

The QSFP optical module 10 shown in FIG. 1 has a quad-channel SFP interface, and can transmit data at a speed four times greater than a single-channel optical module. The QSFP optical transceiver 10 can also receive four optical data signals over separate channels, and have the same size as one XFP optical transceiver. However, as the size of a QSFP optical module is about the same as that of an XFP optical module, it may be important to design or select the size (e.g., diameter) of the TOSAs 1-4 so that the four optical transmitter subassemblies 1-4 are in parallel in the relatively small size of the SFP package. In fact, the width and other dimensions and/or parameters of the QSFP optical module 10 is consistent with or the same as other SFP modules (e.g., SFP, SFP+ and XFP modules). Thus, the present invention is applicable to other module types, as long as they can transmit and receive optical signals over multiple channels. The external width of the QSFP chassis A is 18.5 mm at most, and the internal width is 17 mm at most. The maximum diameter of the TO-38 housing or package of TOSAs 1-4 is 3.8 mm or about 3.8 mm. Thus, the four TO-38 TOSAs 1-4 can be arranged in parallel on the QSFP chassis A, thereby matching the standard size and/or width of the QSFP chassis.

When each laser diode in each of the TOSAs 1-4 is configured to transmit optical signals at a rate of 10 Gb/sec or higher, the QSFP optical module 10 can provide a transmission rate of at least 40 Gb/sec. When the combined widths of the transmitter subassemblies 1-4 match the internal width and other dimensions and/or parameters of the QSFP chassis A, the present invention can provide data at a rate of 4*Y, where Y is the single-mode, single-channel transmission rate, and Y≥10 Gb/sec.

In further embodiments, the first TOSA 1, the second TOSA 2, the third TOSA 3, and the fourth TOSA 4 may be attached or affixed at a predetermined position to a printed circuit board assembly (PCBA) D via one or more flexible connectors (e.g., a flexible polyimide substrate with thin-film conductive electrodes or traces thereon). Thus, the optical module may further comprise the PCBA D. The PCBA D may be attached to the SFP chassis A by screws or rivets.

Figure 2:
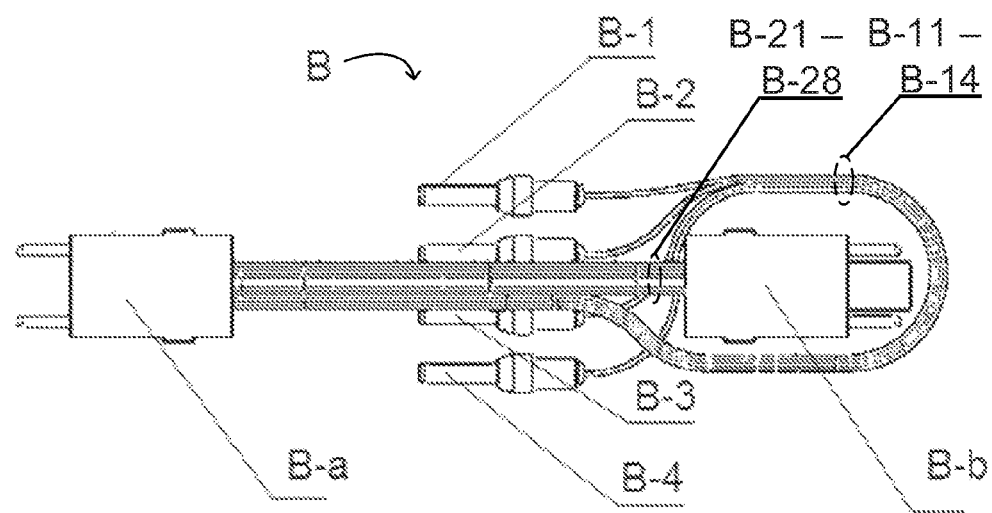
FIG. 2 is a structure chart showing a MT fiber connector in accordance with embodiments of the present invention.

As shown in FIG. 2, a first port B-a of the MT fiber connector B is connected to an MPO connector F. The MT fiber connector B in FIG. 1 comprises a twelve-core MT fiber connector, four of which (designated B-11 through B-14 in FIG. 2) respectively end at first through fourth LC standard fiber stubs B-1 through B-4 that enter the first through fourth TOSAs 1 through 4 (or connectors thereto, one of which is designated "C" in FIG. 1). Optical signals from the first TOSA 1, the second TOSA 2, the third TOSA 3, and the fourth TOSA 4 pass through the first fiber stub B-1, the second fiber stub B-2, the third fiber stub B-3, and the fourth fiber stub B-4, respectively, and then enter the fiber connectors B-11 through B-14 of the MT fiber connector B. The four fiber connectors B-11 through B-14 are connected to the first port B-a of the MT fiber connector, but are separated from the other fiber connectors of the twelve-core MT fiber connector B that are further connected to the second port B-b of the MT fiber connector B.

In single-mode transmissions using the present optical transmitter or module, the glass at the core center of a single-mode fiber (not shown) is relatively fine (e.g., the core diameter is 9 or 10 μm) in comparison with the fiber core of a multi-mode fiber, which may have a diameter of 50~62.5 μm. Thus, it is challenging to couple signals from optical transmitters (e.g., TOSAs 1-4) to single-mode fibers, and the connection of single-mode fibers to TOSAs 1-4 is relatively costly and complicated. To solve this issue, the four fiber connectors B-11 through B-14 from the first MT fiber connector port B-a are separated from the receiver port B-b of the MT fiber connector B, and respectively connected to the first LC standard fiber stub B-1, second LC standard fiber stub B-2, third LC standard fiber stub B-3, and fourth LC standard fiber stub B-4. The first through fourth LC standard fiber stubs B-1 through B-4 are connected to the optical emission ports of the first TOSA 1, the second TOSA 2, the third TOSA 3, and the fourth TOSA 4, respectively. This manner of coupling the fiber stub (e.g., the LC standard fiber stubs) and the TOSA is effective, simplifies the method of assembling the optical module 10, and solves issues with the connection between single-mode fibers and the TOSAs 1-4.

In further embodiments, the second port B-b of the MT fiber connector B is connected to an array-type optical receiver (not shown) below a cover or housing E for the receiver. The array-type optical receiver may be at or fixed to predetermined locations on the PCBA D. The array-type optical receiver comprises an array of four lenses and a corresponding array of four photodiodes (PDs). In one implementation, the photodiodes may are avalanche photodiodes (APDs).

Exemplary Method(s) of Making and Using the Exemplary Optical Module

A method of making an optical module in accordance with embodiments of the present invention pertains to multi-channel, parallel transmission, SFP optical modules, especially those configured to transmit optical signals in a single mode and/or that connect to single-mode optical fibers.

In a first step, a multiple-fiber push-on/pull-off (MPO) connector (e.g., MPO connector F in FIG. 1) is mounted or affixed to a first (optical) end of an SFP chassis (e.g., QSFP chassis A in FIG. 1) at a predetermined position or location. Next, a plurality of TOSAs (e.g., TOSAs 1-4 in FIGS. 1-2) are mounted or affixed to the SFP chassis in parallel at predetermined positions or locations (e.g., in the center region of the SFP chassis, between the optical end and the electrical end). The central axes of the TOSAs are aligned in parallel with each other, and advantageously, with the closest (e.g., uppermost) surface of the SFP chassis. In one example, the TOSAs are mounted to a board or plate that is perpendicular to the closest surface of the SFP chassis to ensure parallel alignment of the TOSA central axes with the closest surface of the SFP chassis. These component-mounting steps can be performed in any sequence.

An array of photodiodes and lenses is mounted or affixed to a PCB (e.g., PCBA D in FIG. 1) at predetermined positions or locations, and the receiver port (e.g., port B-b in FIGS. 1-2) of the MT fiber connector (B in FIGS. 1-2) is mounted or affixed to the PCB adjacent to the array of photodiodes and lenses. The photodiodes and lenses may be secured to the PCB until with an adhesive, for example. A cover (e.g., E in FIG. 1) may be placed over the array of photodiodes and lenses, and secured to the PCB (e.g., by gluing or adhering). The cover may have one or more mirrors on its inner surface (e.g., to reflect incoming optical signals from the receiver port of the MT fiber connector to the array of photodiodes and lenses).

The MT fiber connectors separated from the second port can be secured to the PCB in predetermined locations (e.g., with an adhesive, a clasp secured to the PCB, or a band surrounding the separated MT fiber connectors and extending through the PCB), such that the ends of the separated MT fiber connectors are in locations corresponding to and/or aligned with the TOSAs. The ends of the separated MT fiber connectors are also connected to fiber stubs (e.g., LC standard fiber stubs B-1 through B-4 in FIG. 2), before or after the separated MT fiber connectors are secured to the PCB.

The PCB is mounted on or affixed to the electrical end of the SFP chassis, the fiber stubs are connected to the TOSAs, and the first port of the MT fiber connector (e.g., B-a in FIGS. 1-2) is connected to the MPO connector to complete the optical module or transceiver 10. Optionally, a housing or cover surrounding the components of the optical module or transceiver can be placed over the components and secured to the SFP chassis and optionally to the MPO connector using an adhesive, clasp, snap-on or tongue-in-groove fitting, etc.

Referring to FIGS. 1-2, the operating principle(s) of and/or method of transmitting optical signals using a multi-channel, single-mode, parallel transmission SFP optical module include transmitting optical signals from a first TOSA 1, a second TOSA 2, a third TOSA 3, and a fourth TOSA 4, positioned in parallel on an SFP chassis A; passing the optical signals through a first LC standard fiber stub B-1, a second LC standard fiber stub B-2, a third LC standard fiber stub B-3, and a fourth LC standard fiber stub B-4 corresponding to the first through fourth TOSAs 1-4, and through a mechanical transfer (MT) fiber connector B coupled or connected to the first through fourth LC standard fiber stubs B-1 through B-4; then transmitting the optical signals over optical fibers coupled or connected to a first port B-a of the MT fiber connector B.

A method of receiving optical signals in the optical module or transceiver 10 includes receiving the optical signals through the MPO connector F coupled to the first port B-a of the MT fiber connector B, providing the optical signals over MT fibers B-21 through B-28 in the MT fiber connector B to the second port B-b of the MT fiber connector B, and focusing the optical signals onto an array of photodiodes (not shown) using a corresponding array of plastic lenses (not shown) coupled or connected to the second port B-b. The method may further include converting the optical signals to electrical signals (e.g., using the array of photodiodes), and transmitting the electrical signals to a corresponding communication device (e.g., a host or other electrical device having a slot configured to receive the electrical end of the optical module or transceiver 10) over the PCBA D to which the array of photodiodes is connected. In one example, each of the photodiodes is an avalanche photodiode.

CONCLUSION/SUMMARY

Embodiments of the present invention advantageously provide multi-channel, high-speed optical modules and methods of making and using the same. Relative to the prior art, the present multi-channel, parallel transmission SFP optical module that provides advantageous effects, including a relatively small size, light weight, low production cost, high production efficiency, and an ability to transmit optical signals a distance of more than 10 km at a transmission rate up to 40 Gb/sec (especially in single-mode transmissions).

In addition, a plurality of fiber connectors in an MT fiber connector are respectively connected to fiber stubs of the multiple transmission channels, and thus, the outputs of the TOSAs. This technique makes coupling single-mode fibers to high-speed laser diodes easier. In one embodiment, the MT fiber connector comprises a twelve-core MT fiber connector. Thus, the present invention provides a high speed, large capacity, small volume, light-weight, long transmission distance optical module that can be broadly applied to high speed optical communications.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A multi-channel, parallel transmission, small form-factor pluggable (SFP) optical module, comprising:
   a multi-channel SFP chassis,
   a first transmitter optical subassembly (TOSA) receiving a first multi-mode fiber stub,
   a second transmitter optical subassembly (TOSA) receiving a second multi-mode fiber stub,
   a third transmitter optical subassembly (TOSA) receiving a third multi-mode fiber stub,
   a fourth transmitter optical subassembly (TOSA) receiving a fourth multi-mode fiber stub, and
   a MT fiber connector having a first port with a plurality of fiber connectors therefrom and a second port connected to an array-type optical receiver, wherein:
      said first TOSA, said second TOSA, said third TOSA and said fourth TOSA are in parallel on the chassis, and
      said first multi-mode fiber stub, said second multi-mode fiber stub, said third multi-mode fiber stub and said fourth multi-mode fiber stub are connected to the fiber connectors of the MT fiber connector.

2. The multi-channel, parallel transmission SFP optical module of claim 1, wherein said chassis is a quad-channel small form-factor pluggable (QSFP) chassis.

3. The multi-channel, parallel transmission SFP optical module of claim 2, further comprising a printed circuit board assembly (PCBA), comprising a printed circuit board (PCB) to which the second port of said MT fiber connector is attached.

4. The multi-channel, parallel transmission SFP optical module of claim 3, further comprising a plurality of screws or rivets that attach said PCBA to the SFP chassis.

5. The multi-channel, parallel transmission SFP optical module of claim 3, further comprising the array-type optical receiver on the PCBA, connected to the second port of said MT fiber connector.

6. The multi-channel, parallel transmission optical module of claim 5, wherein said optical receiver comprises an array of photodiodes and a corresponding array of lenses configured to focus optical signals onto the array of photodiodes.

7. The multi-channel, parallel transmission SFP optical module of claim 6, wherein said array receiver of photodiodes is at a predetermined position on the PCBA.

8. The multi-channel, parallel transmission SFP optical module of claim 6, wherein each of said lenses comprises a plastic lens, and each of said photodiodes comprises an avalanche photodiode.

9. The multi-channel, parallel transmission SFP optical module of claim 1, wherein said first TOSA, said second TOSA, said third TOSA and said fourth TOSA transmit signals in a single mode, and said MT fiber connector is configured to connect to a plurality of single-mode optical fibers.

10. The multi-channel, parallel transmission SFP optical module of claim 1, wherein said first TOSA, said second TOSA, said third TOSA and said fourth TOSA are configured to transmit optical signals in a single mode.

11. The multi-channel, parallel transmission SFP optical module of claim 10, wherein each of said first TOSA, said second TOSA, said third TOSA and said fourth TOSA comprise a transistor outline (TO) package or housing and a Fabry Perot (FP) or diffusion feedback (DFB) laser diode.

12. The multi-channel, parallel transmission SFP optical module of claim 1, further comprising a multiple-fiber push-on/pull-off (MPO) connector connected to said first port of said MT fiber connector.

13. The multi-channel, parallel transmission SFP optical module according to claim 1, wherein said MT fiber connector comprises twelve fiber connectors.

14. An optical communication device, comprising the multi-channel, parallel transmission SFP optical module of claim 1.

15. A method of receiving optical signals using the multi-channel, parallel transmission SFP optical module of claim 1, comprising:
  receiving the optical signals through a multiple-fiber push-on/pull-off (MPO) connector coupled to a receiver port of the MT fiber connector;
  providing the optical signals over MT fibers in the MT fiber connector to the second port of the MT fiber connector;
  focusing the optical signals onto an array of photodiodes using a corresponding array of lenses coupled or connected to the second port; and
  transmitting the signals to a corresponding optical communication device over a printed circuit board (PCB) connected to the array of photodiodes.

16. The multi-channel, parallel transmission SFP optical module according to claim 1, wherein each of said first through fourth fiber stubs comprises an LC standard fiber stub.

17. A method of making a multi-channel, parallel transmission optical module, comprising:
  mounting or affixing a multiple-fiber push-on/pull-off (MPO) connector to a first end of a small form-factor pluggable (SFP) chassis;
  mounting or affixing first, second, third and fourth transmitter optical subassemblies (TOSAs) to the SFP chassis in parallel at predetermined positions or locations on the SFP chassis;
  mounting or affixing an array of photodiodes and lenses to a printed circuit board (PCB) at predetermined positions or locations;
  mounting or affixing a mechanical transfer (MT) fiber connector to the PCB such that a receiver port of the MT fiber connector is adjacent to the array of photodiodes and lenses;
  securing a cover to the PCB over the array of photodiodes and lenses;
  connecting first, second, third and fourth fibers of the MT fiber connector to corresponding first, second, third and fourth multi-mode fiber stubs;
  mounting or affixing the PCB to an electrical end of the SFP chassis;
  connecting the first, second, third and fourth multi-mode fiber stubs to the first, second, third and fourth TOSAs, respectively; and
  connecting a first port of the MT fiber connector to the MPO connector.

18. The method according to claim 17, wherein each of said first TOSA, said second TOSA, said third TOSA and said fourth TOSA transmit signals in a single mode, and said MT fiber connector is configured to connect to a plurality of single-mode optical fibers.

19. A method of transmitting optical signals, comprising:
  emitting the optical signals from a first TOSA, a second TOSA, a third TOSA, and a fourth TOSA in parallel;
  passing the optical signals through a first multi-mode fiber stub connected to the first TOSA, a second multi-mode fiber stub connected to the second TOSA, a third multi-mode fiber stub connected to the third TOSA, and a fourth multi-mode fiber stub connected to the fourth TOSA and through a first port of a mechanical transfer (MT) fiber connector, the first port of the MT fiber connector having a plurality of fiber connectors therefrom, and a second port of the MT fiber connector being connected to an array-type optical receiver; and
  transmitting the optical signals over single-mode optical fibers connected to the first port of the MT fiber connector.

20. The method of claim 19, wherein each of the first fiber stub, second fiber stub, third fiber stub, and fourth fiber stub comprises an LC standard fiber stub, and the port of the MT fiber connector includes connections to n optical fibers, where n is the number of channels and is an integer of at least 4.

* * * * *